United States Patent
Domingues

(10) Patent No.: US 9,603,371 B2
(45) Date of Patent: Mar. 28, 2017

(54) CHEMICALLY LEAVENED DOUGH COMPOSITIONS AND RELATED METHODS, INVOLVING LOW TEMPERATURE INACTIVE YEAST

(71) Applicant: General Mills, Inc., Minneapolis, MN (US)

(72) Inventor: David J. Domingues, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 13/793,086

(22) Filed: Mar. 11, 2013

(65) Prior Publication Data

US 2013/0251849 A1 Sep. 26, 2013

Related U.S. Application Data

(62) Division of application No. 11/961,171, filed on Dec. 20, 2007, now Pat. No. 8,414,941.

(51) Int. Cl.
*A21D 10/02* (2006.01)
*A21D 8/04* (2006.01)
*A21D 2/14* (2006.01)

(52) U.S. Cl.
CPC ............. *A21D 8/045* (2013.01); *A21D 2/145* (2013.01)

(58) Field of Classification Search
CPC ................................ A21D 2/145; A21D 8/045
USPC .................... 426/128, 61, 62, 496, 549, 551
See application file for complete search history.

(56) References Cited

U.S. PATENT DOCUMENTS

| | | | |
|---|---|---|---|
| 5,514,386 A | 5/1996 | Domingues | |
| 5,759,596 A | 6/1998 | Domingues et al. | |
| 5,827,724 A | 10/1998 | Gysler et al. | |
| 5,939,109 A | 8/1999 | Domingues et al. | |
| 6,042,852 A | 3/2000 | Atwell et al. | |
| 6,136,378 A | 10/2000 | Singh et al. | |
| 6,261,613 B1 | 7/2001 | Narayanaswamy et al. | |
| 6,733,803 B1 * | 5/2004 | Vidkjaer | 426/62 |
| 6,884,443 B2 * | 4/2005 | Domingues | 426/19 |
| 7,115,293 B2 | 10/2006 | Niederberger et al. | |
| 2003/0049358 A1 | 3/2003 | Domingues | |
| 2004/0022897 A1 | 2/2004 | Katsumi et al. | |
| 2004/0241283 A1 * | 12/2004 | Domingues | A21D 2/181 426/18 |
| 2006/0083841 A1 | 4/2006 | Casper et al. | |
| 2007/0042099 A1 * | 2/2007 | Stanton | A21D 10/045 426/549 |
| 2007/0207240 A1 * | 9/2007 | Hansen | A21D 2/186 426/94 |

FOREIGN PATENT DOCUMENTS

WO    WO-01/32024    5/2001

OTHER PUBLICATIONS

Davidson et al., "Food Science & Technology", Antimicrobials in Food, Third Edition, Taylor & Francis Group, 149, p. 65 (2004).
Pyler, E. J., Baking Science & Technology, 3d Ed., p. 230 (1988).

* cited by examiner

*Primary Examiner* — Lien T Tran
(74) *Attorney, Agent, or Firm* — Diederiks & Whitelaw, PLC; John L. Crimmins, Esq.

(57) ABSTRACT

Described are dough compositions and methods of making dough compositions, the dough compositions being chemically leavened and being prepared from ingredients that include a low temperature inactive yeast and a yeast inhibitor; the methods include inactivating the low temperature inactive yeast to inhibit the metabolic activity of the yeast as desired; the compositions and methods can be used, e.g., to prepare refrigerated dough products.

18 Claims, 3 Drawing Sheets

CHEMICALLY LEAVENED DOUGH COMPOSITIONS AND RELATED METHODS, INVOLVING LOW TEMPERATURE INACTIVE YEAST

CROSS REFERENCE TO RELATED APPLICATIONS

This application is a divisional of U.S. patent application Ser. No. 11/961,171 filed Dec. 20, 2007, now U.S. Pat. No. 8,414,941, entitled "CHEMICALLY LEAVENED DOUGH COMPOSITIONS AND RELATED METHODS, INVOLVING LOW TEMPERATURE INACTIVE YEAST".

FIELD OF THE INVENTION

This invention relates to chemically leavened dough compositions that contain low temperature inactive yeast, and methods of preparing the dough compositions that involve using a preferment dough composition.

BACKGROUND

Dough products are prepared by combining ingredients including yeast, water, and flour, among others. One method by which these ingredients can be combined to produce a dough is by a two-step method according to which a dough "preferment" (also known as a "poolish," "slurry," "yeast slurry," or "sponge") composition is first prepared to include a portion of total dough ingredients, and the balance of the total dough ingredients is later added after a certain amount of processing (e.g., "resting") of the preferment composition.

The preferment is first prepared by combining ingredients thereof. The preferment composition is then allowed a time to rest, during which time yeast will ferment and the ingredients of the dough will develop. After resting, additional dough ingredients are added to form a finished, unproofed dough composition. Generally, for a yeast-leavened dough, yeast is again allowed to ferment in a "proofing" step, which leavens the finished dough composition before cooking. Upon cooking, the proofed dough will exhibit a recognizable flavor and aroma of a fresh-baked yeast-leavened dough product, as well as a light (leavened) composition.

In the dough and bread-making arts there is ongoing need for new and useful dough compositions, e.g., that exhibit desired functionality based on product quality, cost efficiency, or convenience.

SUMMARY

The present patent application describes chemically leavened doughs and dough products, optionally packaged for refrigerated storage. As described, a dough composition is prepared from a preferment dough composition, which includes low temperature inactive yeast ("LTI" yeast.)

The yeast in the preferment dough composition is allowed to metabolize to provide a preferment dough composition that can be used to produce a finished dough composition having desired organoleptic (e.g., flavor, aroma), and physical properties such as rheology that stem from the structure of a dough matrix that contains bubbles. The yeast contributes to the flavor of the finished dough composition, e.g., by producing metabolites associated with a yeast-leavened dough product. The yeast can also, optionally, contribute to the leavening properties of the finished dough composition, e.g., by producing carbon dioxide that can be produced by the preferment dough composition and that are retained within the dough during processing into a finished dough composition. The carbon dioxide can be retained in the form of bubbles that act as nucleating sites and that can expand to leaven the dough composition upon baking. Additionally or alternately, carbon dioxide can be absorbed by the dough matrix, such as in water contained in the dough, and may contribute to leavening upon baking.

The activity of the yeast to form desired metabolites can occur during a rest step, which occurs after combining at least yeast, water, and a yeast nutrient, to form the preferment dough composition. The yeast nutrient can be any fermentable substrate such as sugar, damaged starch, flour, and the like. After the yeast has been active in the preferment, such as during a rest step, there is no further need for the yeast to continue to be metabolically active. According to the invention, the yeast can be inactivated, and any further leavening of the dough composition can be effected by other leavening agents. Preferably, an amount of leavening that occurs after the rest step can be in the form of a controlled amount of leavening produced by chemical leavening agents, e.g., to produce a desired raw specific volume or internal package pressure.

After allowing the yeast to be active and produce metabolites in the preferment dough composition, additional dough ingredients can be added to produce a finished chemically leavened dough composition. The additional dough ingredients can include chemical leavening agents, optionally and preferably toward the end of mixing, e.g., at a final stage of mixing. According to certain embodiments of the invention, a yeast inhibiting agent can be added after the yeast has produced a desired amount of metabolites. The yeast inhibiting agent, in combination with reduced temperature, causes the yeast to become inactive during refrigerated storage.

Thus, in a general sense, the described doughs and methods include the use of low temperature inactive yeast in combination with a step of inactivating the yeast after the yeast has produced a desired amount of metabolites. The yeast can be inactivated by any method, such as by use of a yeast inhibitor in combination with low temperature. The yeast can be inactivated at any time following activity to produce desired metabolites, such as before, during, or after addition of additional dough ingredients; before, during or after later processing to form the dough into dough pieces; or before, during, or after packaging the dough for refrigerated storage. The LTI yeast will produce yeast metabolites during a preferment stage of mixing ingredients of the dough. The metabolites produce desired flavor and aroma properties of a finished dough product, which are flavor and aroma properties normally found in a yeast-leavened dough product. But, the yeast is less important as a leavening agent, so after the yeast has produced the desired metabolites, the yeast can be inactivated. Any additional, subsequent, leavening of the dough composition can preferably be caused to occur by use of chemical leavening agents of selected types and amounts to produce a packaged, chemically leavened dough product that maintains a controlled pressure during refrigerated storage.

The dough product can be any form of chemically leavened dough, with preferred doughs being refrigerator stable, optionally and preferably stable for several weeks over which the internal pressure of the package remains at a moderate or low level, such as below 30 pounds per square inch (gauge) (psig), e.g., below 27 or 25 psig. Exemplary packaging can be in the form of a pressurized or non-pressurized pouch, chub, can, or the like. Specific examples of dough products can be packaged and stored by refrigeration in air-tight (optionally vented or non-vented) packages such as pressurized or non-pressurized cans, chubs, pouches, etc. Yeast that is presented to the preferment dough composition to produce desired metabolites, is inactivated as described, e.g., so that the yeast does not cause uncontrolled leavening during refrigerated storage.

The term "unproofed" refers to a dough composition that has not been processed to include any step intended to cause proofing or intentional leavening of the dough composition. For example, the dough composition may not have been subjected to a specific holding stage for causing the volume of the dough to increase by 10% or more. The raw specific volume (RSV) of an unproofed dough composition can typically be in the range from about 0.9 to about 1.2, e.g., 0.95 to about 1.1 cubic centimeters per gram (cc/g).

"Refrigeration-stable" means that a dough composition undergoes sufficiently little leavening during refrigerated storage to be a useful commercial or consumer dough product that can be stored in a package at refrigerated conditions, e.g., there is not an excessive amount of leavening gas (e.g., carbon dioxide) produced during refrigerated storage, and a package containing the dough does not suffer damage due to expansion of the dough during refrigerated storage, for a time period of at least 6 weeks, 10 weeks, or 12 weeks at a storage temperature of less than 50 degrees Fahrenheit (e.g., less than 45 degrees Fahrenheit).

An aspect of the invention relates to a method of preparing a chemically leavened dough composition. The method includes preparing a preferment dough composition from ingredients that include water, low temperature inactive yeast, and yeast nutrient; resting the preferment dough composition, and combining the rested preferment dough composition with additional dough ingredients to form a dough composition. The additional dough ingredients include flour, sweetener, fat, and chemical leavening agent. The method includes inactivating the low temperature inactive yeast without causing all of the yeast to become non-viable, i.e., without killing the yeast.

In another aspect, the invention relates to a chemically leavened dough composition prepared from ingredients that include water, flour, basic chemical leavening agent, acidic chemical leavening agent, from 0.0075 to 1.5 weight percent low temperature inactive yeast, based on the total weight dough composition, and yeast activity inhibitor in an amount to inactivate the low temperature inactive yeast without killing the yeast (i.e., without causing all of the low temperature inactive yeast to become non-viable).

In another aspect, the invention relates to a chemically leavenable dough composition that contains water, flour, from 0.0075 to 1.5 weight percent inactivated, viable low temperature inactive yeast, based on the weight of the dough composition, and from 0.025 to 0.2 weight percent sorbate salt, based on the weight of the dough composition.

DETAILED DESCRIPTION

Figure 1:
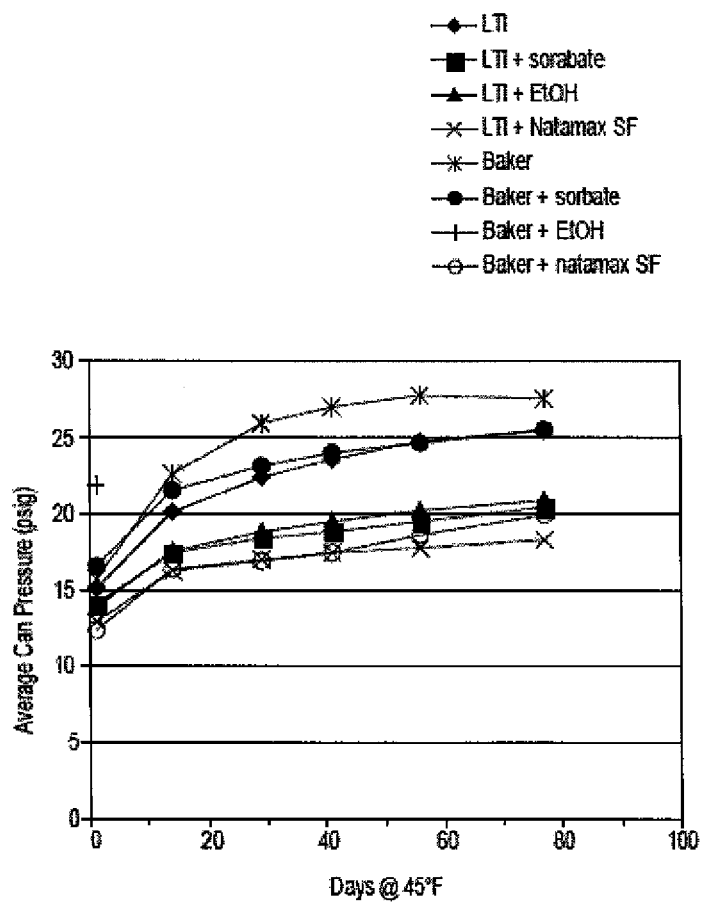
FIG. 1 is a plot of Average Can Pressure vs. Days at 45° F. for a series of dough compositions.

Dough compositions according to the invention include those referred to as "chemically-leavened" (i.e., "chemically-leavenable") dough compositions that leaven to a substantial extent by the action of chemical ingredients that react to produce a leavening gas, normally carbon dioxide. Typically, the dough ingredients include a basic chemical leavening agent and an acidic chemical leavening agent, the two of which react to produce carbon dioxide that when retained by the dough matrix causes the dough to expand or "leaven." Chemically-leavened doughs can be contrasted to dough formulations that are leavened substantially by the metabolic action of yeast as a leavening agent, i.e., by metabolic action of yeast on a substrate to produce carbon dioxide. While doughs of the invention include yeast, e.g., to provide desired flavor and aroma of a yeast-leavened dough product, optional physical properties, and some amount of leavening, dough compositions described herein are leavened to a substantial degree by chemical leavening agents and are referred to as "chemically leavened" dough compositions.

Specific examples of chemically-leavened dough compositions useful according to the present description include dough compositions referred to as "non-developed" dough compositions. The degree of development of a dough (as in a "developed" versus a "non-developed" dough) generally refers to the strength of a dough's matrix, as the strength relates to the degree of development of gluten (protein) in a dough matrix. During processing of a dough composition, gluten can be caused or allowed to interact or react and "develop" a dough composition in a way that increases the stiffness, strength, and elasticity of the dough. Doughs commonly referred to as "developed" doughs are generally understood to include doughs that have a relatively highly-developed gluten matrix structure; a stiff, elastic rheology; and (due to the stiff, elastic matrix) are well able to form bubbles or cells that can stretch without breaking to hold a leavening gas while the dough expands, leavens, or rises, prior to or during cooking (e.g., baking). Features that are sometimes associated with a developed dough include an optimized elastic and extensible rheology for maximum gas retention; a sufficient (e.g., relatively high) protein content to allow for a highly-developed structure; optionally, processing steps that include time to allow the dough ingredients (e.g., gluten) to interact and "develop" to strengthen the dough; and on average a baked specific volume that is relatively higher than non-developed doughs. Oftentimes, developed doughs are yeast-leavened, but may be chemically leavened. Examples of specific types of doughs that can be considered to be developed doughs include doughs for pizza crust, breads (loaves, dinner rolls, baguettes, bread sticks), raised donuts, cinnamon rolls, croissants, Danishes, pretzels, etc.

As compared to "developed" doughs, doughs commonly referred to as non-developed (or "un-developed" or "under-developed") have a relatively less developed ("undeveloped") dough matrix that gives the dough a relatively non-elastic rheology, reduced strength, and reduced gas-holding capacity, compared to more developed doughs. Being less elastic than a developed dough and exhibiting a reduced gas-holding capacity, non-developed doughs, on average, exhibit relatively lower raw and baked specific volumes. Examples of non-developed types of doughs include cookies, cakes, cake donuts, muffins, and other batter-type doughs such as brownies, biscuits, etc.

Chemically-leavened, non-developed, dough compositions can be prepared to include ingredients generally known in the dough and bread-making arts, such as flour, a liquid component such as oil or water, chemical leavening agents, fat (solid or liquid), and optionally additional ingredients such as salt, sweeteners, dairy products, egg products, processing aids, particulates, yeast as a flavorant, other flavorings, and the like.

Doughs as described are prepared using (and, therefore, include) a preferment dough composition; and the described doughs are prepared by what can be referred to as a "preferment" method. In general, steps of preparing such a dough composition can include first, preparation of a "preferment" dough composition that includes flour, water, and yeast.

A preferment dough composition (or "preferment composition," or "preferment") according to the invention can be similar to dough compositions sometimes referred to as a dough "sponge," "slurry," "yeast slurry," or a "poolish." The preferment dough composition is rested to allow yeast to actively metabolize, e.g., ferment. The fermenting yeast produces yeast metabolites that provide flavor, aroma, and optionally leavening and rheology. In specific, metabolites of the yeast in the preferment dough composition carry through from the preferment composition to a final dough composition, to provide desired flavor, aroma, etc., associated with yeast and metabolized yeast in a final dough product.

The preferment dough composition, upon resting, includes a dough matrix having bubbles that can include gas (e.g., carbon dioxide) and water vapor produced by the active yeast. These bubbles can be maintained while the preferment dough composition is further processed to form a finished dough composition. The bubbles can contribute to expansion (leavening) of the finished dough composition upon cooking (e.g., baking). The preferment also has yeast metabolites that provide desired flavor and aroma.

Additionally, yeast in the preferment composition can produce desired rheology of the preferment composition. In specific, the yeast metabolite glutathione is a reducing agent thought to contribute toward desired or optimal extensibility of a dough matrix. Desired or optimal extensibility means that the matrix will function well in terms of gas-holding ability, to hold bubbles of gas produced by the yeast. The matrix is not too stiff and rubbery to prevent extension, but not too loose to prevent bubble formation and bubble retention. Desired rheology of a dough matrix may include an extensibility of the dough matrix that allows bubbles to form and hold gas produced by the yeast so that a portion of the gas and bubbles can be maintained by the dough matrix during subsequent processing to a packaged dough, so the gas can be available within the dough during baking to function as a leavening gas.

According to the invention, a preferment dough composition contains a low temperature inactive yeast. A "low temperature inactive" or "LTI" yeast is a yeast that exhibits reduced metabolic activity (including gas production) upon exposure to lower temperatures—LTI yeast can typically exhibit a cold sensitivity in that the yeast is capable of being metabolically active to produce leavening by-products at temperatures of at least 50 degrees Fahrenheit (10 C.), but becomes inactivated at refrigeration temperatures (e.g., <50° F., 10 C., or at 45° F.). Yeast activity can be measured by monitoring gas evolution of a dough, or by monitoring internal package pressure of a packaged dough composition at refrigerated storage temperature.

LTI yeast has been found to be particularly useful and beneficial for preparing refrigerator stable chemically leavened dough compositions by methods that include inactivating yeast for refrigerated storage, as described, to produce a dough composition that can be stored in a package at an internal pressure of less than 30 pounds per square inch (gauge) (psig), especially less than 25 psig. LTI yeast, when included in a chemically leavened dough composition, has been found to be capable of being inactivated at refrigerated storage temperatures, optionally and preferably without becoming non-viable, to a degree that allows the dough composition to be stored at refrigerated conditions in a package that does not become pressurized to a degree that would damage the package, e.g., without exceeding an internal package pressure of 30 psig, or 25 psig.

In addition to the LTI yeast, the preferment composition may include ingredients useful to provide a preferment dough composition having an extensible dough (sponge) matrix. Examples of such ingredients include water, a yeast food or nutrient, and optionally flour. Flour can be a preferred ingredient but is not necessary for yeast to produce metabolites effective for flavor development. According to the present description, a preferment composition could be in the form of an aqueous yeast suspension that contains water, yeast, and a fermentable substrate (yeast nutrient) such as sugar, in the absence of flour. If flour is not included, the use of a preferment composition that includes metabolically-active yeast can still be of benefit in preparing a dough composition, because metabolic activity of yeast can contribute to flavor.

LTI yeast is known in the dough and bread making arts, and can be purchased commercially or may be identified by known methods of screening yeast for low temperature inactive functionality. See, e.g., U.S. Pat. Nos. 5,939,109, 5,759,596, and 5,827,724, the entireties of each of these being incorporated herein by reference. As will be appreciated, yeast candidates can be tested for low temperature inactive behavior in an initial screening, and then further tested in a dough composition or packaged dough composition for effective low temperature behavior in a refrigerated or refrigerated and packaged environment.

According to the invention, LTI yeast is used to be metabolically active during a step of preparing or resting a preferment dough composition, to produce carbon dioxide and other metabolites. The LTI yeast and the metabolites can contribute to one or more of desired flavor, aroma, leavening properties, and rheology properties of the preferment dough composition or a dough composition prepared from the preferment dough composition. Thus, a preferment dough composition as described can be prepared by combining ingredients including at least LTI yeast, water, and yeast nutrient (optionally flour). These ingredients can be combined in any acceptable manner to produce a preferment dough composition.

Flour can be included in the preferment composition, but is optional, and if desired or useful can be excluded from the preferment dough composition and added in an entire amount (for a particular finished dough composition) to the preferment dough composition as an "additional dough ingredient" after resting. While flour is optional, certain embodiments of the invention include flour in a preferment composition, to provide development of dough, including production of air cells, gluten rheology, and possibly some unique flavors.

Flour included in a preferment composition, if used, can be any suitable flour or combination of flours, such as wheat flour that may be hard wheat winter or spring flour. Such a flour may contain any desired or useful amount of protein such as an amount in the range from about 10 weight percent to about 16 weight percent protein based on the weight of the flour.

If flour is included, a preferment composition can include an amount of flour effective to provide desired structure and consistency, e.g., structure and consistency that allow fermentation of yeast. Exemplary amounts of total flour in a preferment composition can be in the range from 2 to 50 weight percent flour based on the weight of a preferment, e.g., from 8 to 18 weight percent flour based on the weight of the preferment dough composition.

According to the invention, a low temperature inactive yeast ingredient can be included as an amount of a preferment dough composition to provide one or more of desired mechanical and rheological properties of the preferment composition; and desired flavor or aroma properties of a finished dough composition. LTI yeast can be in the form of a yeast ingredient that includes dry yeast, or that includes yeast and an amount of water. LTI yeast is available, for example, as a "hydrated cake" yeast ingredient that includes about 30 percent low temperature inactive yeast material and about 70 percent water. The moisture content of a yeast ingredient can affect the total amount of a yeast ingredient included in a dough composition. Fresh crumbled yeast, cake yeast, and compressed yeast can typically have a moisture content of about 70 percent moisture per total weight of the yeast ingredient. Yeast creams typically have a higher moisture content, and dry yeast ingredients such as dry active yeasts typically have a lower moisture content, e.g., typically about 7 or 8 percent moisture per total weight of the yeast ingredient. Thus, due to differences in moisture content, different amounts of a dry yeast ingredient (including water in a lower amount) would be needed compared to higher moisture content yeast ingredient such as cream yeast, fresh crumbled yeast, cake yeast, or compressed yeast.

The term "yeast ingredient," e.g., when used to describe amounts of yeast in a dough composition, is used herein to refer to yeast in a form that includes the moisture content of the yeast ingredient; the term "yeast" is used alone and not as "yeast ingredient," to refer to an amount of yeast on a dry basis.

Exemplary amounts of LTI yeast ingredient in the form of a cream yeast ingredient, containing approximately 20 weight percent yeast and about 80 weight percent water, included in a preferment dough composition as described, can be included in an amount in the range from 0.025 weight percent to about 5 weight percent cream yeast ingredient based on the total weight of the preferment dough composition. This range corresponds to amounts of yeast on a dry basis in the range from 0.005 to 1.0 weight percent dry yeast per total weight of preferment dough composition. Yeast ingredients that have different (higher or lower) percent moisture can be used as described herein in amounts that will provide the same or similar amounts of the dry yeast material (yeast cells) of the yeast ingredient.

An amount of yeast selected for use with a particular dough composition and method may be based, e.g., on the desired amount of time for which the preferment dough composition is expected to be rested, e.g., to produce desired flavor properties of a finished dough product prepared from the rested preferment dough composition. Amounts of LTI yeast ingredient at the lower portion of this range can be used to produce a preferment dough composition that can be rested for a relatively long period of time (12 to 24 hours), e.g., from 0.025 to 2 weight percent LTI cream yeast ingredient based on the total amount of preferment dough composition (corresponding to 0.005 to 0.45 weight percent LTI yeast per total amount of preferment dough composition, on a dry yeast basis). Amounts of LTI yeast ingredient at the higher portion of this range can be used to produce a preferment dough composition that can be rested for a relatively short period of time (2 to 6 hours), e.g., from 2 to 5 weight percent LTI hydrated cake yeast ingredient based on the total amount of preferment dough composition (corresponding to 0.45 to 1.0 weight percent LTI yeast per total amount of preferment dough composition, on a dry yeast basis).

According to certain embodiments of the invention, the total amount of yeast or yeast ingredient that is included in a final dough composition can be the amount of LTI yeast that is included in the preferment composition, meaning that no additional (non-LTI yeast) is added to the preferment dough composition, and no additional yeast (LTI yeast or non-LTI yeast) is added as an additional dough ingredient after the preferment composition has been prepared or rested. Adding only LTI yeast, and adding the total amount of the LTI yeast to the preferment composition, can result in desired leavening properties according to the invention. In specific, the LTI yeast will be active during the preparation of the preferment composition and during resting of the preferment composition. The LTI yeast can become inactivated at a desired later time.

A preferment dough composition can also include some form of yeast nutrient, which is an ingredient that can be metabolized by the yeast. A yeast nutrient can be a nutrient that is useful with a particular yeast, whereby the yeast and its enzymes can metabolize the nutrient to produce metabolites. A yeast nutrient can be included as a constituent of flour that is included in a preferment composition, or may be added as a separate ingredient such as a sugar. A single example of useful non-flour yeast nutrient is a class of sugars generally known to act as yeast nutrients, including dextrose (i.e., glucose).

The amount of yeast nutrient included in a preferment dough composition can be any amount that is useful for the amount of yeast, to produce a desired amount of metabolites. Examples of useful amounts of non-flour yeast nutrient, such as a sugar, that can be included in a preferment composition, can be an amount in the range from 0.25 to 4.0 weight percent yeast nutrient based on the total weight of the preferment dough composition. Natural sugars in flour are sufficient to fuel yeast metabolism, and no additional sugar is required if flour is included in a preferment.

A preferment dough composition can include liquid water in an amount that, with the other ingredients, will produce a preferment dough composition having useful properties, including useful structure and consistency, i.e., structure and consistency that allow for fermentation of yeast and expansion and retention of bubbles. The amount of water in any particular preferment composition should be an amount that wets out the ingredients and, preferably, provides a preferment composition having sufficient strength and cohesion to maintain bubbles formed upon evolution of gaseous metabolites such as carbon dioxide, e.g., in a closed cell structure of a dough matrix containing bubbles of carbon dioxide. Exemplary amounts of water in a preferment dough composition can be at least about 30 to 60 weight percent water based on the total weight of the preferment dough composition, e.g., an amount in the range from about 50 to 60 weight percent water based on total weight of the preferment dough composition.

A preferment dough composition according to the invention may also include other optional ingredients including amounts of flavoring, sugar, fat (oil or shortening), water-binding agent (e.g., hydrocolloid), starch, or additives or preservatives.

The preferment dough composition is allowed to rest, to ferment and allow the yeast to metabolize. The amount of time for resting can be sufficient to allow the yeast to metabolize to produce desired flavor properties in a finished dough product prepared from the preferment dough composition. During resting, yeast will produce metabolites including carbon dioxide, which can also result in the creation of bubbles or nucleation sites that may improve leavening properties of the finished dough product. The time may optionally allow yeast to produce metabolites that improve rheology of the preferment composition.

The amount of time necessary to allow yeast to be active in a preferment dough composition can depend on desired properties of a preferment dough composition or a dough composition prepared from the preferment dough composition, including, e.g., any one or more of flavor, aroma, mechanical (rheological), and leavening properties. Rest time can also vary based on the amount of yeast included in a preferment dough composition. In general, a useful amount of time for a rest period may be an amount of time required for the preferment dough composition to expand to approximately twice the volume of the unrested preferment dough composition, e.g., to reach a raw specific volume in the range from 1.5 cubic centimeters per gram (cc/g) to 2.5 cubic centimeters per gram, e.g., from 1.5 to 2.5 cc/g. Generally, a rest period in the range from 1 to 24 hours can be effective, with periods of 2 to 6 hours, e.g., 3 to 4 hours, often being sufficient.

The specific volume of the preferment composition is based on bubbles formed in the matrix; upon addition of the additional dough ingredients to the preferment composition, with mixing, the specific volume will be reduced, but will increase again during proofing.

After resting the preferment, and preferably during or throughout refrigerated storage of a dough composition, the low temperature inactive yeast added as an ingredient of the preferment composition can be inactivated. "Inactive" and "inactivated" mean that the yeast added to the preferment dough composition has been affected to cause that yeast to be dormant. To be considered to be "dormant," the yeast may be in a state of suspension wherein the yeast cells are metabolically inactive but remain viable; the yeast are affected in a way that does not cause death but that causes the yeast to be not sufficiently active to produce metabolites. The yeast are still viable and upon removal of the inactivating influence (e.g., sorbate, reduced temperature), the yeast can again become metabolically active.

It is preferred to inactivate yeast in a dough composition, instead of killing the yeast. Dormant yeast, i.e., yeast that is inactivated, doesn't produce negative effects of product quality that can occur if yeast of a dough composition is killed, i.e., becomes non-viable. Killing an amount of yeast cells in a dough composition can produce negative properties in a dough composition such as undesired flavor, reduced or limited shelf life, or reduced physical properties such as mechanical properties (rheology) or baking properties (e.g., leavening properties). In brief, killing a yeast cell can result in damage to or disintegration of the delicate yeast cell membrane, which can allow the internal constituents of a yeast cell to spill into the dough composition. These internal constituents include enzymes and other biological materials that can have a negative impact on dough flavor, shelf life, or physical properties, if not isolated from the dough composition mass by the cell membrane. By inactivating yeast cells without killing the cells, methods and compositions as presently described allow for reduced metabolic action of the yeast during refrigerated storage, without compromising flavor, shelf life, or physical properties, in a manner that may occur if internal constituents of the yeast cells become released from within a yeast cell membrane into the dough composition.

Inactivated yeast, for comparison to yeast that is non-vital or killed, can be identified in a dough composition by standard methods of removing yeast from a dough composition by dilution, then testing for viability by placing the yeast in contact with a yeast nutrient (e.g., plate) and measuring population growth. Known methods of measuring for viable yeast, and measuring yeast populations within a dough, include standard methods for serial dilution. According to preferred methods and compositions of the invention, an amount of LTI yeast used in a dough composition can be inactivated, as described, to inhibit metabolic action after a resting step, but remain substantially viable. Substantially viable means that from an original population of LTI yeast added to a dough composition (e.g., preferment dough composition), after being inactivated as described herein, after refrigerated storage at 50° F., for an amount of time such as 2, 6, or 12, at least 90, e.g., 95 percent of the original yeast cells are viable; alternately, substantially viable can mean that after being inactivated as described, then following refrigerated storage (such as 2, 6, or 12 weeks of refrigerated storage at 45° F. or 50° F.), the amount of viable yeast cells can be within one log (i.e., one degree of magnitude) of the initial yeast population—for example if the original amount of yeast cells added to the preferment composition is $1\times10^4$ (10,000) cells per gram of dough composition, the amount of viable yeast cells after a period of refrigerated storage is within one log of 10,000 cells/gm dough.

A step of inactivating yeast according to the present description means that of a total amount of yeast in a dough formulation, there remains no more than an insubstantial amount of metabolically active yeast. For example, the dough composition does not contain an amount of metabolically active yeast that would produce additional leavening of an unvented, sealed, packaged dough composition, during refrigeration at 45 or 50 degrees Fahrenheit for 12 weeks, to cause the dough package to become damaged, or to cause the internal pressure of the dough package to increase to above 25 pounds per square inch (gauge), e.g., 27 psig, such as 30 psig or above.

Inactivation of yeast after the resting step, and especially during refrigerated storage, prevents unwanted metabolic activity of the yeast after the yeast is used to produce desired metabolites in the preferment dough composition. In specific, inactivation of the yeast prevents further production of carbon dioxide or other metabolites that would cause additional leavening of the dough composition after the rest step, such as after packaging, in a manner that would damage a package that contains the dough. Any later leavening, such as during cooking or baking, to the extent desired, can be effected by leavening agents other than the yeast introduced to the preferment dough composition, such as by chemical leavening agents.

The low temperature inactive yeast can be inactivated by any desired method, such as by adding a yeast inhibitor that causes yeast to become inactive (and no longer produce metabolites), in combination with reduced temperature, e.g., refrigerated temperature such as 45 or 50 degrees Fahrenheit.

A class of yeast inhibitors is organic acids. See e.g., "Microbial Ecology of Foods; Factors Affecting Life and Death of Microorganisms," Volume 1, Ch. 7 ("Organic Acids") (1980 Academic Press). One example of a useful organic acid yeast inhibitor that can be added to a preferment dough composition to inactivate yeast, is sorbate, which refers to a salt that includes the anion (E,E)-hexa-2,4-dienoate and a counterion (cation), that may be sodium, potassium, calcium, etc. (The term "sorbate" is used herein to refer to a sorbate salt). Sorbate is available commercially as a potassium, calcium, or sodium, salt ingredient. Sorbate is generally added to a dough composition as an aqueous (i.e., 10%) solution. According to preferred embodiments of the invention, sorbate has been found to not kill low temperature inactive yeast when exposed to yeast of a preferment dough composition, at refrigerated temperature, e.g., but does otherwise affect the yeast in a manner that makes the yeast metabolically inactive, yet still alive.

Sorbate (i.e., a sorbate salt) may be used in a preferment dough composition in an amount that is effective to inactivate low temperature inactive yeast as described herein, at refrigerated temperatures, to prevent undesirably high pressure build of a packaged dough composition. Exemplary useful amounts of potassium sorbate used in a preferment dough composition as described, may be in the range from 0.025 to 0.2 weight percent potassium sorbate, based on total weight dough composition.

A yeast inhibitor may be added to a dough composition, e.g., a preferment dough composition or a derivative of a preferment dough composition, at a time at or after which yeast is desired to be inactivated. A yeast inhibitor can be added after a rest step and before addition of any additional dough ingredient. Alternately, yeast inhibitor can be added to a dough composition after a resting step, and after addition of some or all additional dough ingredients have been added or mixed. The particular timing of the addition of a yeast inhibitor can be selected based on the timing desired for inhibiting metabolic activity of yeast, e.g., to prevent production of carbon dioxide that leavens a dough composition.

Optionally and preferably, a method that includes inactivating yeast by use of a yeast inhibitor can include adding the yeast inhibitor to inactivate the yeast at a time after desired resting of a preferment dough composition, and during or after addition of additional dough ingredients. For example, sorbate (10% solution in water) can be added along with additional water in a final mixing stage. This timing can cause the yeast to be inactivated for processing of a dough composition, including some or all of the steps of forming a dough for packaging, packaging, and storage.

After a rest step, regardless of the timing selected to inactivate the yeast that was used to produce metabolites in a preferment dough composition, additional ingredients are added to a rested preferment dough composition to produce a finished chemically leavened dough composition. These ingredients can include chemical leavening agents, to cause the chemically leavened dough composition to exhibit controlled leavening properties. Controlled leavening properties can mean, for example, that components of a chemical leavening system will cause a controlled amount of leavening of the finished dough composition, having a known or predictable amount of leavening gas (e.g., carbon dioxide) produced, preferably also with known or predictable timing of the leavening gas production. For example, a chemical leavening system (including, e.g., a basic chemical leavening agent and an acidic chemical leavening agent) can be included in a finished dough composition in an amount that is calculated to produce a desired raw specific volume of the finished dough composition, and to achieve that raw specific volume after being placed in a package. ("Finished dough composition" refers to a dough composition that includes all ingredients in their full amounts.) The raw specific volume that will be achieved upon reaction of the chemical leavening agents can be calculated based on a the production of a desired amount of leavening gas by a chemical leavening system (e.g., acid and base). Also, a desired internal pressure of a package that contains the dough composition, after proofing and expanding inside of the package, can be achieved by accounting for factors that include the total volume of finished dough product placed in a container (i.e., volume before and after proofing); the amount of leavener and, therefore, amount of leavening gas produced, which will determine raw specific volume after leavening; and properties of the package such as package volume.

The additional dough ingredients include a portion of chemical leavening agent, meaning either a basic chemical leavening agent, an acidic chemical leavening agent, or both of these. A portion of chemical leavening agent may optionally be added earlier, to the preferment dough composition; for example, if desired, acidic chemical leavening can be added to the preferment dough composition, and basic chemical leavening agent can be added later, or vice versa.

According to the invention, the preferment dough composition includes yeast that can ferment to produce metabolites, including carbon dioxide, that can affect flavor, leavening, or mechanical properties of a finished dough composition prepared from the preferment dough composition. The low temperature inactive yeast produces these metabolites during a rest step that allows the yeast to be active, and after the rest step the yeast is no longer necessary to produce desired metabolites, and the yeast can be inactivated, preferably without being rendered non-viable (i.e., killed). A chemical leavening agent is included in the dough composition to cause controlled chemical leavening of the dough, e.g., controlled chemical leavening after packaging. The amount of chemical leavening agent included in the dough composition can preferably be sufficient to allow the dough to proof after packaging to a desired specific volume within a package that is of a selected volume and that is designed to be at a selected internal pressure during refrigerated storage.

Chemically-leavenable dough compositions can be prepared from ingredients generally known in the dough and bread-making arts, typically including flour, a liquid component such as oil, water, or both oil and water; a chemical leavening system (e.g., an acidic agent and a basic agent such as bicarbonate); and optional ingredients such as shortening, salt, sweeteners, dairy products, egg products, processing aids, emulsifiers, dough conditioners, yeast as a flavorant, flavorings, and the like. Any one or combination of these ingredients, and others as desired, may be added to the preferment dough composition in preparing a finished dough composition.

Acidic chemical leavening agents are generally known in the dough and bread-making arts. Examples include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), and glucono-delta-lactone (GDL), as well as a variety of others. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). These and other examples of acidic chemical leavening agents useful in the dough compositions are described in Assignee's copending U.S. patent application Ser. No. 09/945,204, filed Aug. 31, 2001, entitled "Chemically-leavenable Doughs and Related Methods," and in U.S. Pat. No. 6,261,613, the entire disclosures of which are incorporated hereby by reference.

The amount of acidic chemical leavening agent included in a dough composition can be an amount sufficient to neutralize an amount of basic chemical leavening agent during proofing, e.g., an amount that is stoichiometric to the amount of basic chemical leavening agent, with the exact amount being dependent on the particular chemical leavening system. A typical amount of acidic agent such as SALP may be in the range from about 0.25 to about 2 parts by weight per 100 parts dough composition, with ranges from about 0.25 to about 1.5 parts by weight per 100 parts finished dough composition being preferred.

Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc. These and similar types of basic chemical leavening agent are generally soluble in an aqueous phase of a dough composition at processing or refrigerated storage temperature.

The amount of a basic chemical leavening agent to be used in a dough composition is preferably sufficient to react with the included acidic chemical leavening agent to release a desired amount of gas for leavening, thereby causing a desired degree of expansion of the dough product. The typical amount of a basic chemical leavening agent (not including the weight of barrier material) may be in the range from about 0.25 to about 2 parts by weight per 100 parts dough composition, with ranges from about 0.75 to about 1.5 parts by weight 100 parts dough composition being preferred.

Optionally, if necessary or desired to control the amount or timing of proofing that occurs in the packaged dough composition, a dough composition can include an acidic or basic chemical leavening agent that is encapsulated. Discussions of encapsulated leavening agents are included in Assignee's copending U.S. patent application Ser. No. 09/945,204, filed Aug. 31, 2001, entitled "Chemically-Leavenable Doughs and Related Methods," and in U.S. Pat. No. 6,261,613.

Encapsulated particles containing basic chemical leavening agent are generally known, and can be prepared by methods known in the baking and encapsulation arts. An example of a method for producing enrobed particles is the use of a fluidized bed.

Additional dough ingredients added to the rested preferment dough composition also include ingredients including water, a fat (e.g., oil or shortening), sweetener such as sugar, starch, additional flour, to produce the finished dough composition. A finished dough composition prepared from the rested preferment composition, and additional dough ingredients, can include any useful amounts of such ingredients, for example: from 10 to 32 weight percent water, from 0.025 to 5 weight percent low temperature inactive yeast, from 0.05 to 5 weight percent sweetener (e.g., sugar), and from 40 to 60 weight percent total flour, added at any time during processing, these numbers being based on the total weight of the finished dough composition.

Once the finished dough composition has been prepared to include full amounts of all ingredients, the finished dough composition can be further processed according to known methods of forming a dough composition into a desired size and shape, followed by other processing steps such as proofing, packaging, refrigerated storage, and cooking. A variety of techniques can be used for processing. For example, processing of a finished dough composition can include one or more of sheeting, extruding, dividing and rounding, and the like; cutting to a desired size and shape; folding; filling; packaging, storing, then later removing from a package and cooking. According to the invention, any processing can be useful, including any one or more of those identified directly above. Methods and equipment for sheeting, shaping, sizing, dividing and rounding, or otherwise processing a dough compositions are well known.

The size and shape of a dough product may depend on the type of dough product being prepared, as well as other factors such as the dough composition, e.g., whether it is light and/or sweet like a donut or heavy like a pretzel or bagel, whether or not it is intended to be heated (e.g., in a toaster), etc. In one preferred embodiment of the invention, the dough product can be cut and rolled into the biscuit, which can be formed by sheeting and cutting.

Methods of shaping and sizing a dough product, including steps of sheeting, cutting, folding, perforating, crimping, and otherwise assembling, are well known, and are described, for example, in Assignee's copending U.S. patent application Ser. No. 09/432,446, filed Nov. 3, 1999, incorporated herein by reference.

A dough composition can preferably be packaged in an unproofed condition, followed by proofing inside of a package, optionally to seal the package from inside. This leavening will be predominantly due to reaction of chemical leavening agents. During proofing, the dough composition expands in volume, i.e., the dough composition becomes less dense, due to production of gaseous carbon dioxide.

The dough composition can be placed into a package before proofing, and allowed to proof while inside of the package. For example, an unproofed, finished dough composition (e.g., a dough piece that contains full amounts of all ingredients, and after processing to cut and shape), soon after processing, can exhibit an "unproofed" raw specific volume in the range from 0.9 to 1.1 cubic centimeters per gram, e.g., from 0.95 to 1.0 cubic centimeters per gram. The dough composition can be placed into a package and allowed to proof within the package. The package can be selected to include a predetermined volume that will accommodate an amount (e.g., volume) of finished dough product, at a desired internal package pressure, after proofing within the package, i.e., after the dough has expanded within the package by reaction of amounts of chemical leavening agents.

Exemplary packages can include certain types of packages known for use with refrigerator-stable chemically leavened dough compositions. These include packages such as pressurized or non-pressurized cans, chubs, pouches, etc., any of which may be flexible or rigid, and optionally vented or non-vented. (A non-pressurized package is considered to exhibit an internal package pressure of not greater than 12 psig during refrigerated storage, e.g., 12 weeks of storage at 45 degrees Fahrenheit; a pressurized package is considered to exhibit an internal package pressure of from 12 to 30 psig during refrigerated storage, e.g., 12 seeks of storage at 45 degrees or 50 degrees Fahrenheit.) Yeast of the packaged dough has been inactivated so that the yeast does not cause leavening of the dough after placement within the package. (Upon exposure to yeast inhibitor, e.g., sorbate, the low temperature inactive yeast will be functionally inhibited, and no more than a minor amount of residual gas production by the yeast may occur after packaging, with complete inactivation of the low temperature inactive yeast occurring upon storage at refrigeration temperature.) The inactivated yeast may, for example, produce sufficiently little gas and metabolites after packaging and during refrigerated storage to not cause an increase of pressure within the package that would damage the package; optionally, the inactivated yeast may cause the internal package pressure to increase to no more than 30 psig, e.g., no more than 25 psig.

The elements of the packaged dough product, including the amount of dough (by volume); the features of a chemical leavening system, such as amounts and character of acidic and basic chemical leavening agents; and the volume of a package; can be chosen to achieve a desired raw specific volume of the finished dough composition within the package. Consequently, the internal pressure of the packaged dough product during extended storage (e.g., refrigerated storage) can be controlled to prevent failure of the package during extended storage. Preferred packaged dough products can exhibit an internal pressure that does not exceed 25 pounds per square inch (gauge) after 10 weeks, or after 12 weeks, of refrigerated storage, at 45 degrees Fahrenheit.

Proofing is conducted until the proper degree of proofing is obtained, which can be measured by the volumetric rise of the dough. Generally, this volumetric rise is in a range to achieve a raw specific volume of about 1.1 to about 1.5 cubic centimeters per gram (cc/g), e.g., between 1.1 and 1.3 cc/g, or from 1.1 to 1.2 cc/gram, measured when dough volume and mass are measured inside of a package for refrigerated storage.

A dough composition, after the preferment composition has been prepared and rested, after mixing in the additional dough ingredients, and after the yeast has been inactivated, will include ingredients that include the reacted chemical leavening agents, inactivated yeast, and yeast inhibitor (e.g., organic acid, such as sorbate). For example, such a dough composition may include water; flour; from 0.0075 to 1.5 weight percent inactivated, viable low temperature inactive yeast; and an amount of sorbate or other yeast inhibitor that is sufficient to inactivate the low temperature inactive yeast during refrigerated storage, preferably without killing the yeast. An exemplary dough composition can contain: from 10 to 32 weight percent water, from 0.025 to 5 weight percent inactivated low temperature inactive yeast, from 0.025 to 0.2 weight percent sorbate, and from 40 to 60 weight percent flour; optionally from 0.5 to 5 weight percent sugar or other sweetener, based on total weight dough composition.

A dough product can be cooked by methods that will be understood. A typical cooking temperature can be in the range of between about 325 F. (163 C.) and about 400 F. (205 C.) for baking and is in the range of between about 350 F. (175 C.). The dough can be baked in any type of oven, such as conventional, convection, or impingement ovens. Microwaving would also be a way of baking the dough composition. The product will perform well in terms of volume expansion in a microwave, and a "browning" solution could be applied to cause the surface to brown.

The baked dough compositions of preferred embodiments of the invention, e.g., including a resting step, exhibit comparable baked specific volume relative to dough compositions prepared without a resting step as described. Exemplary BSVs of baked dough compositions can be in the range from about 2.5 (cc/g) to at least 4 or more, preferably from about 3 to about 4 (cc/g).

The following examples evaluate the effects of various yeast inhibiting agents on the can pressure profile of chemically leavened refrigerated dough made with LTI and baking yeast polish, at 45° F. and 50° F. storage temperatures.

45° F. Results

When no inhibitory agent is added to the dough, the LTI yeast evolve less gas and, as a result, display lower can pressures compared to a similarly formulated samples made with commercial baker's yeast (LTI control can pressures ~4 psi<baker's yeast control can pressures).

Both the control LTI and the control baker's yeast sample sets survived the 45° F. storage period (internal can pressure remained below 30 psig).

The baker's yeast poolish sample plus ethanol burst within the first 14 days of storage @45° F. Ethanol addition resulted in greater can pressures for the baker's yeast poolish formula compared to the no additive baker's yeast control.

Addition of ethanol to the LTI poolish sample resulted in inhibition of yeast metabolism and lower can pressures (~5 psig decline plus ethanol vs. LTI control, 20 psig vs 25 psig end of shelf life can pressures respectively).

Addition of sorbate effectively inhibited yeast metabolism in both the LTI and baker's yeast poolish dough samples. The LTI poolish/sorbate sample displayed a lower can pressure profile compared to the baker's yeast/sorbate sample set (LTI/sorbate ~5 psi<baker's yeast/sorbate can pressures). The final average can pressure for the LTI poolish/sorbate sample was ~21 psig which is comparable to the LTI poolish/ethanol end of shelf life can pressure average and well below the 30 psig upper burst limit of the 214×509 can.

Addition of natamax to either LTI or baker's yeast poolish formulas resulted in yeast death and lower can pressure profiles vs. shelf life time @45° F. (~18-20 psig end of shelf life pressure).

50° F. Results

In general, the increase in storage temperature from 45 to 50° F. raised the observed can pressure profiles by ~5 psig. As a result, within the first 14 days of storage at 50° F., the baker's yeast control, baker's yeast plus ethanol, and LTI control cans all burst.

The baker's yeast plus sorbate samples burst after ~37 days.

Addition of ethanol to the LTI yeast poolish formula resulted in a maximum equilibrated can pressure of ~28 psig (close to the 30 psig maximum).

Addition of sorbate to the LTI poolish formula resulted in a maximum equilibrated can pressure of ~25 psig (5 psig<the ethanol LTI sample set). At 50° F., addition of sorbate to the LTI poolish formula resulted in greater yeast inhibition compared to the addition of ethanol to the LTI poolish formula.

Both the baker's yeast poolish and LTI yeast poolish plus natamax displayed can pressure profiles comparable to the LTI poolish plus sorbate sample set with maximum equilibrated can pressures of ~24-25 psig.

Enumeration Results

Addition of natamax (natamycin) effectively kills the yeast in the dough samples (both baker's yeast and LTI yeast).

Addition of sorbate and ethanol has minimal/no effect on yeast population (viability) in the dough.

Can pressure measurements show a reduction in yeast metabolic activity with the addition of sorbate (and ethanol with LTI yeast). A reduction in metabolic activity with~no or little change in yeast population would indicate that the yeasts are viable but metabolically dormant.

Informal bake assessment of the poolish containing dough samples vs. storage time indicates little rheological change (i.e., little/no adverse enzymatic or degradative reactions as a result of yeast activity).

This study was initiated to determine if one could employ a combination of LTI yeast polish plus inhibiting agents to further limit yeast gas production in chemically leavened refrigerated dough upon storage at abusive refrigeration temperatures (i.e., 50° F.).
Procedure, Materials and Methods:
Formula & Process
i. Evaluated two yeast strains to make poolish
1. an LTI yeast
2. control baking yeast
ii. Made four dough formulas each poolish yeast sample
1. Control (no inhibiting agents)
2. Plus EtOH
3. Plus sorbate
4. Plus natamax (anti-mycotic agent natamycin)
Evaluation—Monitored can pressure (lid deflection method) vs. storage time @45° F. (every two weeks out to 77 days)
Observations General Observations: Referring to FIG. 1, when no inhibitory agent is added to the dough, the LTI yeast evolve less gas and, as a result, display lower can pressures compared to similarly formulated samples made with commercial baker's yeast (LTI control can pressures ~4 psi<baker's yeast control can pressures). Both control LTI and baker's yeast sample sets survived the 45° F. storage period (remained below 30 psig). The baker's yeast poolish sample plus ethanol burst within the first 14 days of storage @45° F. Ethanol addition resulted in greater can pressures for the baker's yeast poolish formula compared to the no additive baker's yeast control. Addition of ethanol to the LTI poolish sample resulted in inhibition of yeast metabolism and lower can pressures (~5 psig decline plus ethanol vs. LTI control, 20 psig vs 25 psig end of shelf life can pressures respectively). Addition of sorbate effectively inhibited yeast metabolism in both the LTI and baker's yeast poolish dough samples. The LTI poolish/sorbate sample displayed a lower can pressure profile compared to the baker's yeast/sorbate sample set (LTI/sorbate ~5 psi<baker's yeast/sorbate can pressures). The final average can pressure for the LTI poolish/sorbate sample was ~21 psig which is comparable to the LTI poolish/ethanol end of shelf life can pressure average and well below the 30 psig upper burst limit of the 214×509 can. Addition of natamax to either LTI or baker's yeast poolish formulas resulted in yeast death (see enumeration plot below) and lower can pressure profiles vs. shelf life time@45° F. (~18-20 psig end of shelf life pressure).

Figure 2:
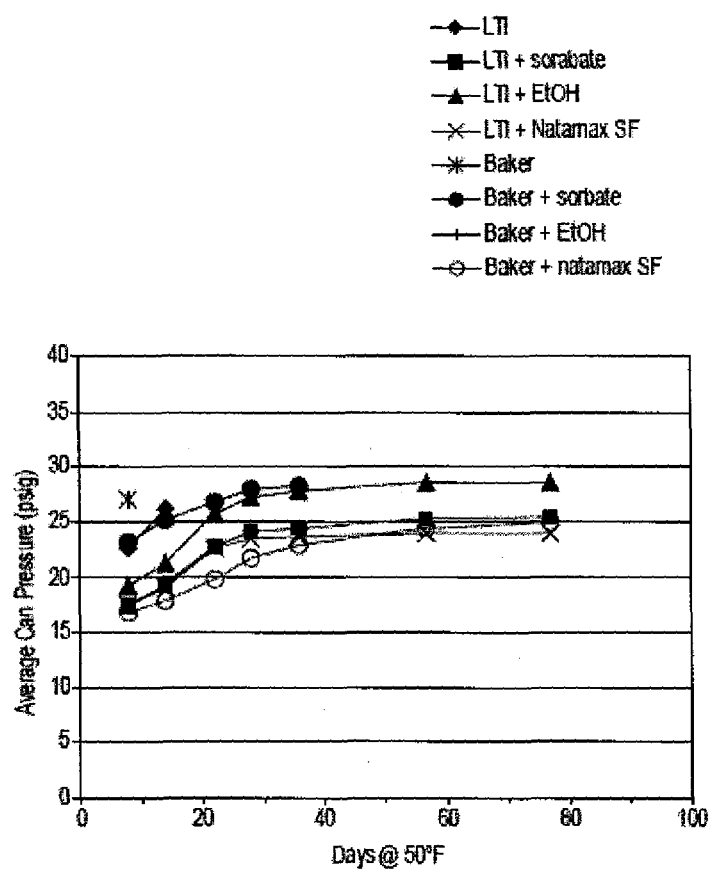
FIG. 2 is a plot of Average Can Pressure vs. Days at 50° F. for a series of dough compositions.

General Observations: Referring to FIG. 2, in general, the increase in storage temperature from 45 to 50° F. raised the observed can pressure profiles by ~5 psig (compare plots 1 and 2).

As a result, within the first 14 days of storage at 50° F., the baker's yeast control, baker's yeast plus ethanol, and LTI control cans all burst. The baker's yeast plus sorbate samples burst after ~37 days. Addition of ethanol to the LTI yeast poolish formula resulted in a maximum equilibrated can pressure of 28 psig (close to the 30 psig maximum). However, addition of sorbate to the LTI poolish formula resulted in a maximum equilibrated can pressure of ~25 psig (5 psig<the ethanol LTI sample set). At 50° F., addition of sorbate to the LTI poolish formula resulted in greater yeast inhibition compared to the addition of ethanol to the LTI poolish formula. Both the baker's yeast poolish and LTI yeast poolish plus natamax displayed can pressure profiles comparable to the LTI poolish plus sorbate sample set with maximum equilibrated can pressures of ~24-25 psig. In summary, to maintain acceptable can pressures in dough formulas made with fermented yeast poolish safely below 30 psig upon storage at 50° F., one either has to 1) kill the yeast in the dough with the addition of natamax (natamycin) or 2) Use a combination of LTI yeast and sorbate.

Figure 3:
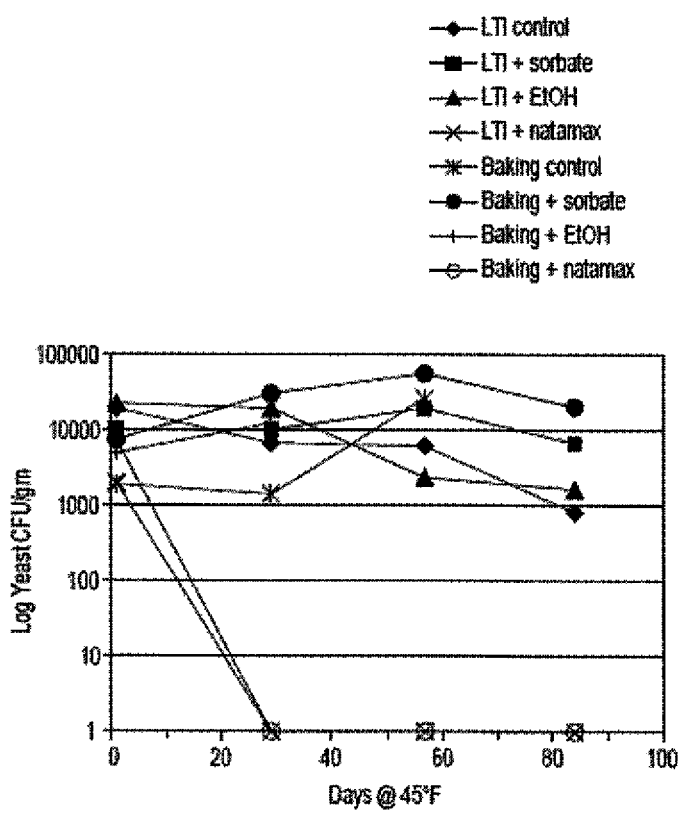
FIG. 3 is a plot of the Yeast Enumeration of Dough (reported in Log Yeast CFU/gm) vs. Days at 45° F. for a series of dough compositions.

General Observations: Referring to FIG. 3, the addition of natamax (natamycin) effectively kills the yeast in the dough samples (both baker's yeast and LTI yeast). Addition of sorbate and ethanol has minimal/no effect on yeast population (viability) in the dough. Recall, can pressure measurements show a reduction in yeast metabolic activity with the addition of sorbate (and ethanol with LTI yeast). A reduction in metabolic activity with~no or little change in yeast population would indicate that the yeasts are viable but metabolically dormant. Furthermore, informal bake assessment of the poolish containing dough samples vs. storage time indicates little rheological change (i.e., little/no adverse enzymatic or degradative reactions as a result of yeast activity).

| LTI and Baking Cream Yeast Assessment Batch (gm) 10000 | | | |
|---|---|---|---|
| Ingredient | IS | % | gm |
| Poolish | | | |
| flour | 21608 | 17.45 | 1745 |
| water | | 17.45 | 1745 |
| Yeast* | | 0.03329 | 3.329 |
| First Stage | | | |
| Poolish | | 34.93329 | 3493.329 |
| flour | 16018 | 35.8715 | 3587.15 |
| gluten | 15905 | 3.3335 | 333.35 |
| ice water | 11659 | 13.56 | 1356 |
| shortening | | 3.03 | 303 |
| xanthan gum | 11555 | 0.1 | 10 |
| monoglycerides | 12236 | 0.28 | 28 |
| gluzyme | 11228 | 0 | 0 |
| DATEM | 203790 | 0.25 | 25 |
| Ascorbic acid | 211546 | 0.015 | 1.5 |
| Top note | | 0 | 0 |
| Bread Flavor | | 0 | 0 |
| Second Stage | | | |
| salt | 18206 | 1.4 | 140 |
| sucrose | 19202 | 1.8 | 180 |
| dextrose | 19226 | 2 | 200 |
| GDL | | 0.833 | 83.3 |
| SALP | 203560 | 0.375 | 37.5 |
| Third Stage | | | |
| e-soda | 216411 | 1 | 100 |
| TOTAL | | 98.78 | 9878 |
| Run 1 control First Stage | | | |
| 10% sorbate sol. | | 0 | 0 |
| 75.5% EtOH | | 0 | 0 |
| Natamax SF | | 0 | 0 |
| Run 2 sorbate First Stage | | | |
| 10% sorbate sol. | | 1 | 100 |
| 75.5% EtOH | | 0 | 0 |
| Natamax SF | | 0 | 0 |
| Run 3 EtOH First Stage | | | |
| 10% sorbate sol. | | 0 | 0 |
| 75.5% EtOH | | 1.32 | 132 |
| Natamax SF | | 0 | 0 |
| Run 4 Natamax First Stage | | | |
| 10% sorbate sol. | | 0 | 0 |
| 75.5% EtOH | | 0 | 0 |
| Natamax SF | | 0.002 | 0.2 |

*Made eight separate dough samples, runs 1-4 with LTI cream yeast poolish and runs 1-4 with baking cream yeast poolish Poolish Combine ingredients and let stand for ~24 hours at ambient temp.

Mixing BU target=900+/−100
Stage 1: 30 sec. 36 rpm
    4 min. 72 rpm
Stage 2: 30 sec. 36 rpm
    3 min. 72 rpm
Stage 3: 30 sec. 36 rpm
    1 minutes 72 rpm Sheeting & Packaging 1) Sheet by numbers to 8 mm, 3 fold, 90° turn, sheet to 5 mm 2) Cut larger dough pad to 476 gm and package into 204 can.

What is claimed is:

1. A method of preparing a chemically leavened dough composition, the method comprising
preparing a preferment dough composition from ingredients comprising
water,
low temperature inactive yeast, and
yeast nutrient,
resting the preferment dough composition, and
combining the rested preferment dough composition with additional dough ingredients to form a dough composition, the additional dough ingredients comprising
flour,
sweetener,
fat,
chemical leavening agent, and
sorbate in an amount in a range from 0.025 to 0.2 weight percent and sufficient to inactivate the low temperature inactive yeast while maintaining viability of the low temperature yeast at a level of at least 90 percent in the dough composition during storage of from 45 to 50 degrees Fahrenheit,
placing the dough into a vented package, and
allowing the dough to partially proof within the package to expand and seal the vented package from inside the package and to pressurize the package to between 12 and 30 pounds per square inch (gauge) at a temperature in a range from 45 to 50 degrees Fahrenheit,
wherein the packaged dough can be stored at 50 degrees Fahrenheit for at least 12 weeks during which storage period an internal package pressure does not exceed 27 pounds per square inch (gauge).

2. The method of claim 1 wherein the resting step comprises resting the preferment dough composition for a time in the range from 2 to about 6 hours.

3. The method of claim 1 wherein the chemically leavened dough composition
comprises
from 10 to 32 weight percent water,
from 0.025 to 5 weight percent low temperature inactive yeast,
from 0.05 to 5 weight percent sugar,
from 40 to 60 weight percent flour, and
from 0.025 to 0.2 weight percent sorbate salt,
based on the total weight of the dough composition.

4. The method of claim 1 comprising inactivating the yeast at a time after the preferment dough composition has been rested to achieve a raw specific volume in the range from 1.5 to 2.5 cubic centimeters per gram.

5. The method of claim 1 comprising
placing the dough composition in an unproofed state into a package while the dough composition has an unproofed raw specific volume in the range from 0.9 to 1.1 cubic centimeters per gram,
refrigerating the dough at a temperature in a range from 45 to 50 degrees Fahrenheit.

6. The method of claim 5 wherein
the dough proofs inside of the package to a raw specific volume in the range from 1.1 to 1.3 cubic centimeters per gram measured inside of the package to seal the package from the inside, and
the packaged dough can be stored at 50 degrees Fahrenheit for at least 12 weeks during which storage period an internal package pressure does not exceed 27 pounds per square inch (guage).

7. The method of claim 1, wherein the dough can be stored for 12 weeks at 45 degrees Fahrenheit, after which the dough contains an amount of the inactivated low temperature inactive yeast that is equal to the amount of the inactivated low temperature inactive yeast added to the preferment composition, reduced by no more than one log (base ten).

8. The method of claim 1 wherein the package is a can sealed by the dough from the inside of the can.

9. The method of claim 8 wherein
the dough proofs inside of the can to a raw specific volume in the range from 1.1 to 1.3 cubic centimeters per gram measured inside of the can, and
the packaged dough can be stored at 50 degrees Fahrenheit for at least 12 weeks during which internal package pressure does not exceed 27 pounds per square inch (gauge).

10. The method of claim 1 wherein the amount of gas produced by the inactivated yeast is sufficiently small to avoid damaging the sealed package during 6 weeks of storage at 45 degrees Fahrenheit.

11. The method of claim 10 comprising adding the sorbate to the dough after the resting step.

12. The method of claim 11 wherein the dough composition contains from 0.025 to 0.2 weight percent sorbate.

13. The method of claim 12, wherein the dough can be stored for 12 weeks at 45 degrees Fahrenheit, after which the dough contains an amount of the inactivated low temperature inactive yeast that is equal to the amount of the inactivated low temperature inactive yeast added to the preferment composition, reduced by no more than one log (base ten).

14. The method of claim 1 comprising adding the sorbate to the preferment dough composition after the resting step.

15. A method of preparing a dough composition, the method comprising:
preparing a preferment dough composition from ingredients including:
water;
low temperature inactive yeast; and
yeast nutrient;
resting the preferment dough composition;
combining the rested preferment dough composition with additional dough ingredients to form a dough composition, the additional dough ingredients comprising:
flour;
sweetener;
fat;
chemical leavening agent; and
sorbate in an amount sufficient to inactivate the low temperature inactive yeast while maintaining viability of the low temperature yeast at a level of at least 90 percent in the dough composition during storage of from 45 to 50 degrees Fahrenheit;

placing the dough composition into a vented package;

allowing the dough composition to partially proof within the package to expand and seal the vented package from inside the package and to pressurize the package; and refrigerating the dough composition at a temperature in a range from 45 to 50 degrees Fahrenheit.

16. The method of claim 15, wherein the dough composition can be stored at 45 degrees Fahrenheit for at least 6 weeks without the package suffering damage.

17. The method of claim 15, wherein the dough composition can be stored at 50 degrees Fahrenheit for at least 12 weeks during which storage period an internal package pressure does not exceed 27 pounds per square inch (gauge).

18. The method of claim 15, wherein the sorbate is present in the dough composition in an amount from 0.025 to 0.2 weight percent based on the total weight of the dough composition.

* * * * *